(12) United States Patent
Porubcan

(10) Patent No.: US 6,878,179 B2
(45) Date of Patent: Apr. 12, 2005

(54) FERTILIZER COMPOSITIONS AND METHODS OF MAKING AND USING SAME

(75) Inventor: Randolph S. Porubcan, Shakopee, MN (US)

(73) Assignee: Microbes, Inc., The Woodlands, TX (US)

(*) Notice: Subject to any disclaimer, the term of this patent is extended or adjusted under 35 U.S.C. 154(b) by 433 days.

(21) Appl. No.: 10/038,676

(22) Filed: Dec. 31, 2001

(65) Prior Publication Data

US 2003/0167811 A1 Sep. 11, 2003

(51) Int. Cl.$^7$ ................................................ C05F 11/08
(52) U.S. Cl. .................. 71/6; 71/12; 71/21; 71/24; 71/26; 71/31
(58) Field of Search ..................... 71/6, 12, 21, 24, 71/26, 31, 28

(56) References Cited

U.S. PATENT DOCUMENTS

| | | | | |
|---|---|---|---|---|
| 3,674,649 A | * | 7/1972 | Formisano et al. | 435/142 |
| 4,459,149 A | * | 7/1984 | Moran et al. | 71/24 |
| 4,743,287 A | * | 5/1988 | Robinson | 71/12 |
| 5,702,701 A | | 12/1997 | O'Donnell | 424/93.46 |
| 6,025,187 A | | 2/2000 | Penaud | 435/262.5 |
| 6,056,885 A | * | 5/2000 | Wasinger | 210/760 |
| 6,174,472 B1 | | 1/2001 | Johnson et al. | 264/118 |
| 6,228,806 B1 | | 5/2001 | Mehta | 504/117 |
| 6,232,270 B1 | | 5/2001 | Branly et al. | 504/117 |
| 6,245,121 B1 | * | 6/2001 | Lamy et al. | 71/1 |
| 6,312,492 B1 | | 11/2001 | Wilson | 71/21 |

FOREIGN PATENT DOCUMENTS

WO    9628400    * 9/1996

OTHER PUBLICATIONS

Richard J. Lewis, Sr., Hawley's Condensed Chemical Dictionary, 12$^{th}$ Edition, (1993), p. 608.

* cited by examiner

Primary Examiner—C. Sayala
(74) Attorney, Agent, or Firm—Jeffrey L. Wendt (57) ABSTRACT

Fertilizer compositions for plant production are described, comprised of decontaminated manure and *Bacillus* spores, preferably a humic acid derived from lignite and, optionally, one or more of N compounds, P compounds, K compounds, and combinations of two or more of these compounds. Preferred compositions are those wherein the ingredients are blended into an admixture resulting in a granular product. Other preferred compositions are those blended into an admixture resulting in a powdered product. Preferably, the ingredients are formed into hardened prills or pellets. Processes for production and use are also presented.

23 Claims, 2 Drawing Sheets

5

10

15  1) PREPARE DECONTAMINATED MANURE → MANURE TREATMENT 20  2) OBTAIN HUMIC ACID AND N-P-K INGR. → LAB Q.C.

25  3) PREPARE BACILLUS SPORES → FERMENTATION 30  4) MIX DRY INGREDIENTS → DECONTAMINATED MANURE + HUMIC ACID + N-P-K

5) GRIND DRY INGREDIENTS → 100 – 150 MESH 35  6) SPRAY ON BACILLUS SPORES → GRANULATE 40  7) PRODUCE PRILLED PRODUCT → – ROTATING DRIER – COOL – SCREEN – BAG

FIG. 1

1) PREPARE DECONTAMINATED MANURE → MANURE TREATMENT

2) OBTAIN HUMIC ACID AND N-P-K INGR. → LAB Q.C.

3) PREPARE BACILLUS SPORES → FERMENTATION

4) MIX DRY INGREDIENTS → DECONTAMINATED MANURE + HUMIC ACID + N-P-K

5) GRIND DRY INGREDIENTS → 100 – 150 MESH

6) SPRAY ON BACILLUS SPORES → GRANULATE

7) PRODUCE PRILLED PRODUCT → – ROTATING DRIER – COOL – SCREEN – BAG

FIG. 2

FERTILIZER COMPOSITIONS AND METHODS OF MAKING AND USING SAME

BACKGROUND OF THE INVENTION

1. Field of the Invention

The invention is generally related to the field of formulation and use of fertilizer compositions for agricultural use. More specifically, the invention relates to fertilizer compositions that contain viable *Bacillus* bacteria and decontaminated animal manure.

2. Related Art

One of the principal goals of agricultural science has been to invent a perfect fertilizer composition that is capable of optimizing food plant production when used at minimum application rates and that, subsequently, will not degrade or adversely affect the soil ecosystem. The present invention attains this goal.

It is well understood that nitrogen (N), the single most important plant nutrient, has been over used in modern agriculture in an effort to encourage maximum plant yields. Nitrogen in the form of soluble nitrates is particularly harmful to the environment since nitrates readily leach out of soil and cause pollution of ground and surface waters.

Technology that permits lower use rates of N while maintaining plant yields is required worldwide. The present invention provides such technology by combining unique ingredients and processing them in such a way as to arrive at potentiated fertilizer compositions capable of effecting substantial benefits in plant production. The novelty of the present invention relates to specific synergisms between the various ingredients and to the processing technology that renders such ingredients functional.

Microorganisms and animal manures have been utilized heretofore in various fertilizer preparations in the past; yet none of these have achieved substantial commercial success. This is because such prior art has not proven to be economically efficacious under real farming conditions. Technologies involving microbes and animal manures have been plagued with inconsistencies due to the nature of these complex, organic substances.

Animal manure represents a significant resource that is under utilized and, when not properly treated or disposed, causes substantial environmental damage. One significant limitation of manure is the gross microbial contamination present in fresh manure; typically, the total number of viable microorganisms ranges between 1–10 billion per gram. The microbial species composition of fresh manure varies significantly and it is not uncommon to find deleterious putrefying bacteria as well as plant and animal pathogens. Using such manure for food plant production can pose health hazards and when added to soil along with beneficial microorganisms, such as probiotic *Bacillus* bacteria, the microorganisms contributed by the manure out grow the beneficial probiotic microorganisms. This can lead to unintended, non-advantageous results.

U.S. Pat. No. 6,228,806, Mehta, claims a biochemical fertilizer but no mention is made of using decontaminated manure as a source of the organic ingredients. Other non-manure organics are indicated. A broad list of microorganisms, listed by genera, is claimed in claim 10, which includes *Bacillus*, but this claim simply lists all the genera that may contain beneficial microorganisms, not novel as they are listed as such in numerous textbooks, and does not give any specific examples of species with performance data. The need for microbial nutrients is mentioned in claim 14 but these must be part of the microorganism ingredient, not the bulk organic ingredient as in my invention (where decontaminated manure feeds the *Bacillus*). Also, very important, I have discovered that the decontaminated manure specified in my invention uniquely stabilizes our product. Mehta offers claims that specify the need to coat, or encapsulate, microorganisms with a water soluble coating, presumably for stability. This would be costly and unnecessary according to my invention.

U.S. Pat. No. 6,312,492, Wilson, discloses improved fertilizer effect of poultry manure by adding sulfuric acid followed by drying. Wilson teaches specifically the co-addition of cellulose containing materials. These would decrease the effectiveness of decontaminated manure in my invention as they would not feed the *Bacillus* microorganisms and would take up valuable space in the product.

U.S. Pat. No. 6,232,270, Branly et al., focuses on using *Bacillus* bacteria to enhance the effectiveness of chemical herbicides and lists every imaginable *Bacillus* ever discovered, and claims they will all benefit this purpose. Unfortunately, the use of chemical herbicides is teaching away from the present invention, which employs a more total organic approach where chemicals are ultimately eliminated.

U.S. Pat. No. 5,702,701, O'Donnell, claims the use of a unique strain of *Bacillus laterosporus* (BOD strain) to benefit plants. I have tested this strain and it is not the same as our CM-3 strain of *Bacillus laterosporus*, for example, it does not adhere to plant roots and does not benefit actinomycetes and N-fixing bacteria in the rhizosphere. Nothing in the O'Donnell patent indicates how to compound *B. laterosporus* into a potentiated biofertilizer with the other active ingredients of our invention.

U.S. Pat. No. 6,174,472 describes a process of forming a pellet comprised of at least sixty percent composted sewer sludge, up to forty percent cellulosic plant material and up to fifteen percent nutrient materials and chemicals for soil enhancement and plant nutrition that provides a combination of both long and short term beneficiation of soil and herbage and has no pathogenic microbes above regulatory ranges. The composted sewer sludge comprises primary sewer sludge admixed with cellulosic plant material that is thermally treated at temperatures between 140 and 180° F. during composting to destroy mesophyllic pathogenic microbes and the viability of reproducible botanicals including seeds, but leave most thermophilic soil enhancing microbes in a viable state. Additional fibrous cellulosic material and chemicals are admixed with the composted sewer sludge and the mixture pelletized in a thermal process that raises pellet temperature to between 140 to 180° F. The nutrient and chemical materials selectively comprise nitrogenous fertilizers, phosphate, potash, trace elements, herbicides, insecticides and botanical chemicals. In the examples of the patent, three samples of composted primary sewer manure are presented, with the statement that "all of the heavy metal tests and bacterial assays were well within present regulatory standards of the Environmental Protection Agency required for use of the composted product as an agricultural soil enhancer." However, the levels of cadmium, arsenic, and lead are high enough to be a concern, and these composted primary sewer samples are primarily useful only for ornamental plants and turf production, not food production.

U.S. Pat. No. 6,025,187 describes bacterial complexes comprising at least one non-pathogenic *Bacillus* and at least one non-pathogenic Lactobacillus which essentially allow the conversion of inorganic nitrogen into organic nitrogen, in the form of bacterial proteins, which allow the conversion of excrement into nitrogenous compounds (stable nitrogenous compounds and/or compost) and, particularly for waste having a sufficient C/N ratio (in relation to the level of solids content), into non-polluting compounds rich in fulvic acid and humic acid, by digestion and conversion of excrements, while at the same time removing the associated pathogenic germs, in particular *Clostridium, Bacteroides, colibacilli, Listeria, salmonellae* and *staphylococci*. Unfortunately, the complexes disclosed in this patent require lactobacillus in addition to *bacillus*, and convert part of the excrement into humic acid, rather than adding humic acid from an external source, wherein the source and composition of the humic acid may be strictly controlled.

There is a great but heretofore unmet need worldwide for technology that permits lower use rates of N while maintaining plant yields. The present invention provides such technology by combining unique ingredients and processing them in such a way as to arrive at potentiated fertilizer compositions capable of effecting substantial benefits in plant production. The novelty of the present invention relates to specific synergisms between the various ingredients and to the processing technology that renders such ingredients functional.

SUMMARY OF THE INVENTION

In accordance with the present invention, fertilizer compositions that contain viable *Bacillus* bacteria and decontaminated animal manure are presented. Optionally, these formulations preferably also contain humic acid and N—P—K substances, where N means nitrogenous or nitrogen-containing compounds (organic or inorganic), P indicates phosphorous-containing (organic or inorganic compounds), and K indicates potassium-containing (organic or inorganic compounds). More specifically, the invention concerns compositions comprising at least one species of probiotic *Bacillus* bacteria that exert a positive effect on the yield of agricultural plants and/or reduce the nitrogen requirements of agricultural plants, and animal manure that has been decontaminated to reduce the concentration of undesirable microorganisms.

Thus, a first aspect of the invention is a fertilizer composition for plant production comprised of decontaminated manure and *Bacillus* spores, and preferably humic acid and, optionally, one or more of N compounds, P compounds, K compounds, and combinations of two or more of these compounds (for example two N compounds, an N compound with a P compound, two K compounds, or one each of N compound, P compound, and K compound). Preferred compositions are those wherein the ingredients are blended into an admixture resulting in a granular product. Other preferred compositions are those blended into an admixture resulting in a powdered product. Preferably, the ingredients are formed into hardened prills or pellets. The decontaminated manure is preferably derived from manure selected from the group consisting chicken or swine manure, particularly produced without litter or bedding, and produced from animals not receiving growth-promoting antibiotics in their feed.

Other preferred compositions of the invention are those wherein the *Bacillus* spores are from strains of probiotic *Bacillus* bacteria capable of enhancing beneficial microbial populations within the rhizosphere. Preferably, the decontaminated manure has a total aerobic/facultative viable plate count reduced by 2–4 logs (100 to 10,000 times) compared to raw manure.

Yet other preferred compositions of the invention are those wherein the humic acid is derived from lignite.

As used herein, "humic acid" means a polymeric compound typically containing the brownish-black pigment melanin, and can be obtained from lignite. It is soluble in bases, but insoluble in mineral acids and alcohols. It is not a well-defined compound, but a mixture of polymers containing aromatic and heterocyclic strictures, carboxyl groups, and nitrogen, and is used in drilling fluids, printing inks, and plant growth. See Hawley's Condensed Chemical Dictionary, $12^{th}$ Edition, (1993), page 608. As seen in the examples herein, not all humic acids behave in similar fashion Still other preferred compositions of the invention are those wherein the N compounds are selected from the group consisting of urea, ammonium sulfate, ammonium nitrate, ammonium phosphate, calcium nitrate, potassium nitrate, sodium nitrate; the P compounds are selected from the group consisting of ammonium phosphate, superphosphate, $Ca(H_2PO_4)_2$, tricalcium phosphate, phosphate salts of sodium or potassium, including orthophosphate salts; and the K compounds are selected from the group consisting of KCl, potassium sulfate, potassium nitrate, and phosphate salts of potassium, including orthophosphate salts.

Preferred compositions of the invention are those wherein the decontaminated manure has a total aerobic/facultative viable plate count reduced by 2–4 logs (100 to 10,000 times) compared to raw manure.

Previously known methods relating to the treatment of manure have proven either ineffective or expensive. The present invention discloses simple, inexpensive methods of decontaminating animal manure and, concomitantly, preserving its agronomic value while simultaneously rendering it into such a form that uniquely stabilizes advantageous probiotic *Bacillus* bacteria when they are admixed or further processed with decontaminated manure. This novel discovery was unexpected.

Thus, a second aspect of the invention is a method of making the fertilizer compositions of the first aspect of the invention, the method comprising the steps of:

a) treating raw manure to form a substantially decontaminated manure by a process selected from the group consisting of
  i) pit composting the raw manure (preferably for 2 to 3 years) to make a partially decontaminated raw manure, and solar drying the partially decontaminated raw manure (preferably to reduce the moisture content to less than about 20 weight percent) to make the substantially decontaminated manure;
  ii) reacting the raw manure with concentrated mineral acid (preferably hydrochloric acid, sulfuric acid, phosphoric acid or nitric acid, the mineral acid preferably added in sufficient quantity to reduce the pH below 3.0) to make the partially decontaminated manure, and subsequently drying the partially decontaminated manure (preferably to reduce the moisture content to less than about 20 weight percent) to form the substantially decontaminated manure;
  iii) reacting the raw manure with a hypochlorite compound to make the partially decontaminated manure, and subsequently drying the partially decontaminated manure to form the substantially decontaminated manure; and iv) combinations of these; and b) combining the substantially decontaminated manure with a second composition comprising *Bacillus* spores to produce the fertilizer composition.

Optionally, if the fertilizer composition produced by the methods of the invention is desired to be in the form of prills or pellets, humic acid is added as a hardening agent, either in the second composition of step (b), or added as a third step (c). Preferably, the humic acid is selected from the group consisting of leonardite and potassium humate. The hypochlorite compound is preferably selected from the group consisting of either calcium hypochlorite, sodium hypochlorite, and mixtures thereof. The hypochlorite compound is preferably added at about 0.5 to about 3.0 percent by weight.

The treating step of the inventive methods produces a "substantially decontaminated manure", which means the decontaminated manure has a total aerobic/facultative viable plate count reduced by a factor of from about 2 to about 4 logs (100 to 10,000 times) compared to raw manure.

Preferred methods of the present invention are those wherein the *Bacillus* spores are prepared in water suspension prior to step (b) and then added to the (preferably dry) ingredients of step (a) in the liquid suspension.

The compositions of the invention preferably have *Bacillus* spores present in sufficient concentrations to effect a viable spore count of between 10^6 cfu to 10^9 cfu per gram of dry composition. All preferred *Bacillus* spores herein have been deposited at the American Type Culture Collection ("ATCC"), 10801 University Blvd., Manassas, Va. 20110-2209, under accession numbers indicated herein. The strains of *B. subtilus* and *B. lichenformis* were deposited Aug. 27, 2004, while the strains of *B. laterosporous* were deposited prior to Aug. 27, 2004. Preferably, the *Bacillus* spores come from *Bacillus* selected from the group consisting of *Bacillus laterosporus* (ATCC PTA-3952), *Bacillus laterosporus* (ATCC PTA-3593), *Bacillus licheniformis* (ATCC PTA 6175), *Bacillus subtilis* (ATCC PTA-6174), and mixtures thereof. More preferably, the *Bacillus* spores come from mixtures of two or more of *Bacillus laterosporus* (ATCC PTA-3952), *Bacillus laterosporus* (ATCC PTA-3593), *Bacillus licheniformis* (ATCC PTA 6175), and *Bacillus subtilis* (ATCC PTA-6174).

It was further unexpected to discover that decontaminated manure functioned as an acceptable nutrient source for *Bacillus* growth and reproduction within the rhizosphere of plants; thus, creating a yield enhancing and/or nitrogen sparing effect.

Thus a third aspect of the invention is a method of increasing the yield of a plant while reducing the nitrogen effect, the method comprising the steps of:

a) supplying to a rhizosphere of a plant a sufficient amount of a composition of the invention to increase yield without significantly increasing the nitrogen effect; and b) maintaining contact between the rhizosphere of the plant and the composition for a time sufficient to enhance yield of the plant while reducing nitrogen effect.

Another aspect of the present invention relates to the discovery that humic acid substances used in admixture with *Bacillus* bacteria and decontaminated manure permit a prilled or pelleted fertilizer product to be produced that has advantageous physical properties, especially compression strength. Thus, a fourth aspect of the invention is a method of making a prilled or pelleted fertilizer product, the method comprising the steps of:

a) producing a substantially decontaminated manure in accordance with the second aspect of the invention;

b) combining the substantially decontaminated manure of step (a) with a second composition comprising *Bacillus* spores to produce the fertilizer composition;

c) adding humic acid from an external source to the fertilizer composition to form a modified fertilizer composition; and d) forming a prilled or pelleted product, under conditions of temperature and pressure suitable to produce the product.

A further aspect of the present invention is the discovery that certain probiotic *Bacillus* species cause an increase in numbers of unrelated, yet beneficial, microbial species within the rhizosphere and, concomitantly, cause significant yield increases and/or nitrogen sparing effects. Thus another aspect of the invention is a method of increasing concentration of beneficial non-bacillus organisms in a rhizosphere, the method comprising applying an effective amount of a composition of the invention to a rhizosphere for a time sufficient to increase concentration of non-bacillus beneficial organisms in the rhizosphere, the non-bacillus beneficial organisms selected from the group consisting of actinomycetes and nitrogen fixing bacteria.

As stated herein, preferred fertilizer compositions of the invention are prills or pellet, i.e., solid forms of fertilizer. Since many areas of the world where increased food production is essential are also areas where there is hydrocarbon production, in particular natural gas, either actual or potential, integration of fertilizer and hydrocarbon production facilities is contemplated. In particular, natural gas or other hydrocarbon may be employed as fuel to create heated air, which may then be used to heat and dry raw manure in the production of substantially decontaminated manure, and in drying wet fertilizer composition after combination of decontaminated manure with wet second composition comprising *bacillus* organisms.

Thus, another aspect of the invention is an integrated method for production solid fertilizer and hydrocarbons, comprising the steps of:

a) producing a hydrocarbon composition from a source of hydrocarbon and using at least a portion of the hydrocarbon composition as fuel to heat (by direct or indirect contact) an air stream to create heated air;

b) contacting (directly or indirectly) a partially decontaminated raw manure composition with a first portion of the heated air to form a substantially decontaminated manure composition;

c) combining the substantially decontaminated manure composition with an aqueous composition comprising *bacillus* spores to form a wet fertilizer composition; and d) contacting (directly or indirectly) the wet fertilizer composition with a second portion of the heated air to form a solid fertilizer composition.

If the air stream used in the step (a) has been specially treated, for example to remove moisture, it may be desirable to reuse this air stream. In other words, after exchanging heat in step (b) the first portion of the heated air stream may be reheated and used in step (d) as the second portion of heated air.

The above advantages and aspects of the invention will be further understood with reference to the following description and claims.

DESCRIPTION OF PREFERRED EMBODIMENTS

Methods of Making Fertilizer Compositions

In accordance with the present invention, novel fertilizer compositions are presented which improve the effectiveness of probiotic *Bacillus* microorganisms used to enhance plant yields and/or reduce nitrogen requirements. The compositions of the present invention also preferably improve the effectiveness of *Bacillus* microorganisms utilized for bioinsecticide and biofungicide applications, and other agronomic applications utilizing *Bacillus* bacteria. The discoveries of the present invention are capable of potentiating any *Bacillus* microorganism that has advantageous applications in agronomy or agriculture.

A major aspect of the present invention involves the production of fertilizer products in forms selected from the group consisting of slurries, liquids, and solid forms. One particularly preferred solid fertilizer product of the invention is in the form of stable prills or pellets comprised of probiotic *Bacillus* microorganisms, decontaminated animal manure, humic acid substances, and, optionally, N—P—K ingredients.

Although it is possible to experience the benefits of the present invention by simply admixing these various ingredients, or by admixing only the decontaminated manure and the *Bacillus* microorganisms, then applying said admixtures to soil as such, preferred embodiments recommend production of stable prills or pellets. Said prills/pellets preferably have shape selected from the group consisting of round, oval, cylindrical and combinations of these, with diameter ranging from about 1 to about 20 mm, more preferably ranging from about 2 to about 8 mm, moisture content ranging from about 1 to about 40 percent, more preferably ranging from about 10 to about 20 percent, and compression hardness ranging from about 5 to about 7 newtons.

Figure 1:
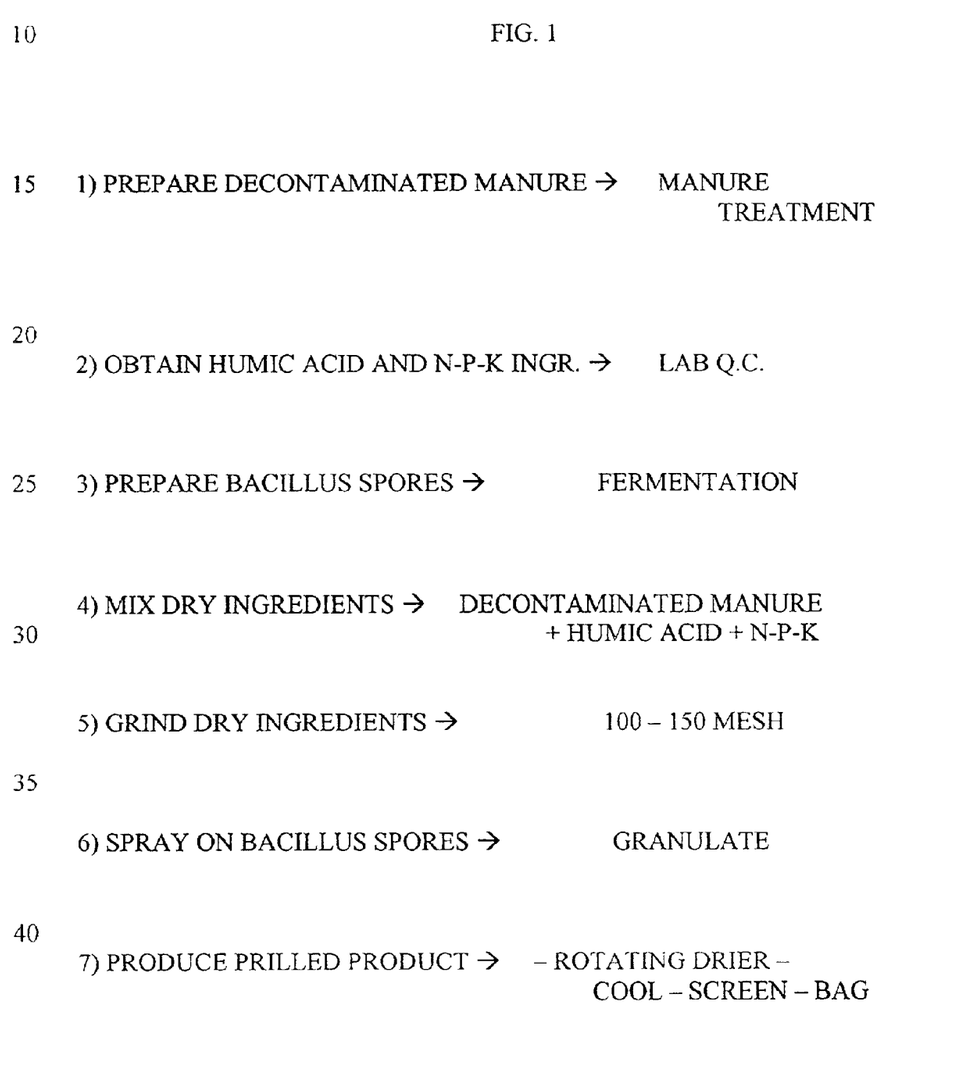
FIG. 1 illustrates a logic diagram for production of solid fertilizers compositions in accordance with the invention.

The preferred solid products of the invention are preferably prepared using means known within the fertilizer trade. One satisfactory, preferred method, which is illustrated in FIG. 1, involves granulating the dry ingredients followed by drying in a revolving drum drier that produces round or oval prills. However, due to the presence of probiotic *bacillus* cultures, their production generally requires adjustments in the operating parameters of the granulation and drying equipment from those typically used in the production of solid forms of fertilizer. These adjustments involve controlling product temperature and exposure time (as generally taught in the examples herein) to insure that operating conditions are less severe compared to what would be experienced in the production of less sensitive, conventional solid fertilizers. When the teachings of the present invention are properly followed they result in the production of advanced technology fertilizer products that contains both organic and inorganic components and a defining content of probiotic *Bacillus* bacteria of high purity and prolonged shelf life. When fertilizer formulations of the present invention are applied to food plants, significant yield enhancements result and reductions in total nitrogen requirements can be achieved.

Dry ingredients, including decontaminated manure (ranging from about 20 to about 70 weight percent of the solid product formulations), humic acids (preferably ranging from about 5 to about 25 weight percent of the solid product formulations) and N—P—K compounds (preferably ranging from about 20 to about 60 weight percent of the solid product formulation, if used) are ground to mesh size ranging from about 50 to about 400 mesh, more preferably ranging from about 100 to about 150 mesh. These ingredients are blended (in no specific order), and then conveyed into a granulator where an aqueous spore suspension of the *Bacillus* microorganisms is sprayed onto the revolving dry ingredients. Preferably, from about 5 to about 15 percent of dechlorinated water is applied by weight, said water containing all of the *Bacillus* spores required to produce the batch. The moistened ingredients are then conveyed into a rotating drying tunnel/drum where the temperature of the product is preferably maintained at temperature ranging from about 70 to about 90° C. for a time ranging from about 1 to about 30 minutes, more preferably from about 5 to about 15 minutes, subsequently, the product enters a cooling tunnel and is cooled rapidly to a temperature ranging from about 30 to about 40° C. The resulting prills, formed by the rotation and drying process, are preferably screened for size and filled into fertilizer bags, completing the process.

A novel aspect of the present invention is the degree of *Bacillus* purity in the fertilizer compositions of the invention. "Purity", as used in reference to bacillus purity herein, means (total viable *bacillus*)/(total anaerobic+total facultative aerobic microorganisms). Preferably, the *bacillus* purity is above 60 percent, more preferably greater than 80 percent, and most preferably greater than 90 percent. The preferred solid prills contain a high percentage of manure ingredients (typically and preferably ranging from about 40 to about 60 percent of the solid fertilizer composition), and contain a viable *Bacillus* plate count (plated on tryptic soy agar after heating a sample at about 80° C. for about 10 minutes followed by incubation at 32° C. for about 72 hours) that is greater than 90 percent of the total viable plate count (plated on tryptic soy agar without the heating step). The solid fertilizer composition of the invention in the form of prills, so produced, preferably have an effective shelf life of at least 6 months, more preferably at least 12 months at temperatures ranging from about 25 to about 35° C.

An aspect of the present invention allows fertilizer formulations to be customized with respect to levels of N—P—K to suite various plants or soil conditions. It is also possible to produce an organic fertilizer formulation that does not contain inorganic sources of N—P—K. Typical formulations are set out in the example section of this disclosure, listed in Table 1 are some of the many N—P—K variations that are possible within the scope of the present invention.

TABLE 1

| Plant | N-P-K in Fertilizer Composition[1] |
|---|---|
| Rice-1 | 8-4-8 |
| Rice-2 | 10-5-10 |
| Rice-3 | 15-5-10 |
| Leaf Vegetables | 6-3-3 |
| Tobacco | 1-2-3 |
| Watermelon | 1-0.7-1.5 |
| Potatoes - 1st appl. | 7-7-7 |
| Potatoes - 2nd appl. | 10-4-6 |
| Corn & Wheat - 1st appl. | 7-7-7 |
| Corn & Wheat - 2nd appl. | 10-4-6 |
| Fruit Trees | 8-6-7, 7-5-9, 30-1-1 |
| Non-leaf Vegetables | 7-7-7, 6-3-3 |
| Turf | 7-7-7, 6-3-3, 1-2-3 |
| Ornamentals & Flowers | 6-3-3, 7-7-7, 30-1-1 |

[1]wt percent N, wt percent $P_2O_5$, wt percent $K_2O$

*Bacillus* Bacteria

The *Bacillus* spore suspension is preferably prepared by conventional techniques well understood by industrial microbiologists. Resulting spore suspensions preferably have a viable *Bacillus* spore count ranging from about 50,000,000 cfu/ml ($5 \times 10^7$ cfu/ml) to about 10,000,000,000 cfu/ml ($1 \times 10^{10}$ cfu/ml), more preferably ranging from about $2 \times 10^8$ to about $2 \times 10^9$ cfu/ml.

Any *Bacillus* microorganism that produces stable spores can be used in the process of the present invention. Examples of such *Bacillus* species include but are not limited to: *B. subtilis, B. laterosporus, B. licheniformis, B. uniflagellatus, B. cereus, B. coagulans, B. polymyxa, B. lentus, B. chitinosporus, B. pumilus, B. megaterium, B. thuringiensis, B. sphaericus, B. mycoides, B. popilliae, B. stearothermophilus, B. macerans, B. lentinmorbus, B. pasteurii, B. alvei, B. azotoformans, B. alcalophilus, B. circulans, B. brevis, B. badius, B. firmus, B. globisporus, B. larvae*.

In preferred embodiments of the present invention, strains of *Bacillus* species that are capable of exerting a positive effect on the microbial composition of the rhizosphere are utilized. In particular, it is advantageous to use strains that produce significant increases in the populations of Actinomycetes and nitrogen-fixing bacteria within the rhizosphere. Experiments #1 and #2 demonstrate this effect in carrot rhizosphere soil. In Experiment #1, a strain of *Bacillus laterosporus* (ATCC PTA-3952) causes an increase of >1 log in Actinomycetes and nitrogen-fixing bacteria. In Experiment #2, a strain of *Bacillus licheniformis* (ATCC PTA 6175) produces a similar result.

Manure Treatment

One of the critical discoveries of the present invention involves the unique application of animal manure in potentiating the effect of the *Bacillus* microorganisms; specifically, chicken or swine manure, produced without litter or bedding, and produced from animals not receiving growth-promoting antibiotics in their feed. Chicken manure, for example, contains the following amounts of N, P ($P_2O_5$), and K ($K_2O$) in lbs. per 1,000 U.S. gallons: N=80, $P_2O_5$=36, $K_2O$=96. In addition, there are many organic compounds that may serve as microbial nutrients. Fresh layer chicken manure, 13% dry matter content, contains over one billion or $1 \times 10^9$ cfu/gram of aerobic/facultative microorganisms, drying at 65° C. reduces this count, slightly, by approximately one-half. Such manure, nutrient content not-withstanding, cannot be used in the present invention. Manure with high concentrations of microorganisms will grossly contaminate the fertilizer formulations of this invention and result in poor growth of probiotic, *Bacillus* microorganisms in the rhizosphere. Experiment #3 illustrates this point—*B. laterosporus* (ATCC PTA-3593) grown in sterile 1% chicken manure grows out to $1 \times 10^8$ cfu/ml, proving that manure ingredients support the growth of *Bacillus*; however, in 1% raw chicken manure, *B. laterosporus* (ATCC PTA-3593) develops a count below $1 \times 10^5$ cfu/ml. The present invention requires substantially dry manure, moisture content preferably less than 20 weight percent, preferably less than 15 weight percent, chicken or swine origin, that has a microbial plate count below ten million or $1 \times 10^7$ cfu/gram (aerobic/facultative: total plate count on tryptic soy agar, 3 days, 32° C.), preferably below one million or $1 \times 10^6$ cfu/gram. This represents a 100 to 1,000 fold reduction, two-three logs, compared to the total count in fresh manure. When manure with a microbial content below one million cfu/gram is used according to the teachings of the present invention, the resulting fertilizer formulations preferably have a *Bacillus* purity of 90 percent or greater. For lack of definitive terminology this inventor will use the term "decontaminated manure" for manure that has a reduced viable plate count according to the specifications stated above.

Experiment #4 illustrates the unique synergism that exists between probiotic *Bacillus* bacteria and decontaminated manure, treated by the hypochlorite process of the present invention, when they are used separately and in combination in potato production; potato yields are significantly greater when the combination is used. It is apparent that nutrients contained in the decontaminated manure stimulate the growth of the *Bacillus* within the rhizosphere environment leading to increased potato yields. A variety of techniques can be used to reduce viable microbial numbers in manure. One technique that has been used successfully in China involves long term composting in pits, for 2–3 years, followed by solar drying for 2–3 weeks. This may not be practical for use in some other countries, due to higher labor costs, but is acceptable for the purposes of the present invention.

Experiment #5 sets out two alternate techniques involving chemical treatment followed by hot air drying that were developed for the purpose of the present invention. Both result in a dry manure product with a microbial count below one million cfu/gram and both are relatively inexpensive and fast, requiring less than 2–3 days to complete. It is not the intention of the present invention to teach all the techniques that can be used to reduce the viable microbial content of manure, any method that renders the total microbial count below ten million cfu/gram and, most preferably, below one million cfu/gram, is acceptable for the purpose of the present invention. It is possible that manure with higher microbial contents, such as manure containing $>10^7$ cfu/gram, may have utility within the scope of the present invention, but this would not be within the preferred embodiments of the present invention.

A second, unexpected discovery of the present invention relates to the stabilizing effect that dry, decontaminated manure has on the viability of *Bacillus* spores to storage under adverse conditions (35 C at >80% relative humidity). This is clearly indicated in Experiment #6 where the effect of blending spores of *B. laterosporus* (ATCC PTA-3952), *B. licheniformis* (ATCC PTA-6175), or *B. subtilis* (ATCC PTA-6174) in decontaminated chicken or swine manure is compared to a blend prepared in a dry N—P—K mixture and a blend containing manure and N—P—K. After 6 months at 35 C/80% relative humidity, blends containing decontaminated manure had spore counts significantly higher (>one log) compared to the N—P—K mixture. This is relevant to the shelf-life of fertilizer formulations containing N—P—K ingredients that are prepared according to the teachings of the present invention. I do not understand the mechanism of this effect, it may relate to a protective effect rendered by certain complex organic compounds present in the treated manure. It is well known in the trade that sterile soil is a protective medium for *Bacillus* spores, manure decontaminated to the extent specified by the present invention may duplicate the effect of soil to some degree or, some heretofore unknown effect may be operating.

Humic Acid

Fertilizer prills made according to the present invention require a hardness rating of 5 to 7 newtons. Prills with hardness values below 5 newtons readily break up during handling and shipment; prills with hardness values >7 are too hard and do not release nutrients effectively in the rhizosphere. Addition of humic acid derived from oxidized lignite, or leonardite, is particularly effective as a hardening agent for the purpose of the present invention. Potassium humate derived from oxidized lignite is also effective. Humic acid addition levels, as a percent of complete fertilizer formulation, range between 5–25% depending on the composition of the formulation. Other known hardening agents such as sodium bentonite or lignosulfonates do not perform as well as humic acid for the purpose of the present invention. Humic acid substances derived from lignite also contain fulvic acid but at a lower concentration compared to humic acid. There is evidence presented in Experiment #7 that higher levels of fulvic acid may further benefit the physical characteristics of prilled or pelleted formulations of the present invention.

A good source of humic acid is lignite from Black Hills Bentonite, L.L.C. of Mills, Wyo. Lignite is a pure, non causticized leonardite that has a solubility of 70–75% in caustic solution and contains, typically, 87% humic acid and 8% fulvic acid. A good source of humic acid containing higher levels of fulvic acid is available from leonardite formations mined in New Mexico. A good source of potassium humate is available from LignoTech USA of Bridgewater, N.J.

Experiment #7 illustrates the importance of using humic acid substances as a hardener in prilled fertilizer formulations produced according to the present invention. When compared to sphagnum moss (peat moss) or sodium bentonite, the use of humic acid results in prills/pellets with superior hardness ratings.

Integrated Fertilizer/Hydrocarbon Gas Production

One preferred embodiment of the invention integrates the concepts of hydrocarbon production and solid fertilizer production. As discussed herein, on aspect of making dry fertilizer compositions of the invention is drying of the partially decontaminated manure, and drying of the mixture of *bacillus*, decontaminated manure, and other optional ingredients, such as humic acid and N—P—K ingredients.

Figure 2:
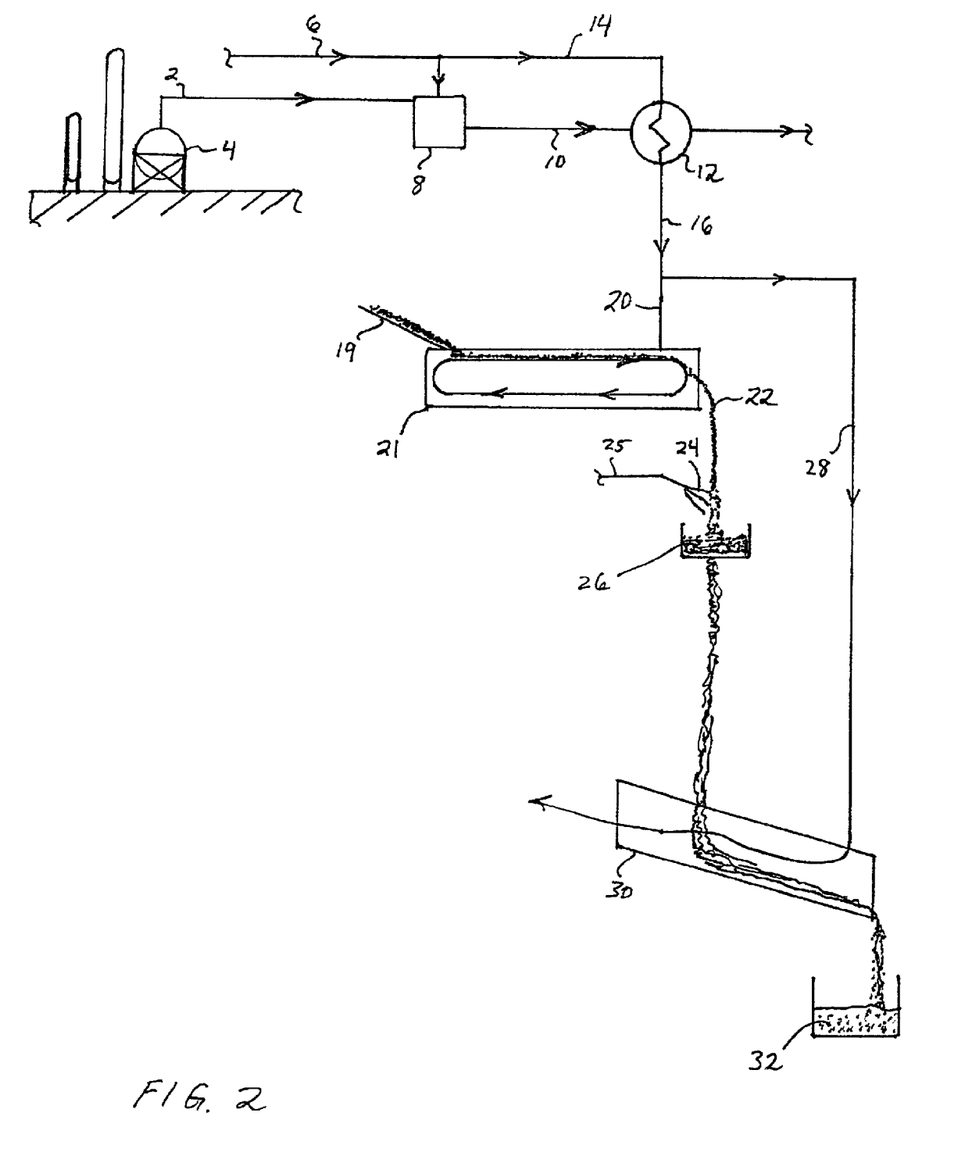
FIG. 2 illustrates a schematic process flow diagram of an integrated fertilizer/hydrocarbon gas production facility.

One integrated method for production solid fertilizer and hydrocarbons is illustrated in FIG. 2. This preferred process 1 comprises the steps of producing a hydrocarbon composition 2 from a source of hydrocarbon 4, and using at least a portion of hydrocarbon composition 2 as a combustion fuel with an air stream 6 in a burner or combustion chamber 8 to form hot combustion products 10. Hot combustion products 10 exchange heat in a heat exchanger 12 (by direct or indirect contact) with an air stream 14 to create a heated air stream 16. The source of hydrocarbon could be a refinery, chemical plant, oil or natural gas drilling or production site, and then like. A partially decontaminated raw manure composition 18 is delivered by suitable means 19 to a contacting means 21, such as a tunnel/conveyor belt arrangement. The partially decontaminated raw manure composition 18 contacts (either directly or indirectly) a first portion of the heated air 20 in contacting means 21 to form a substantially decontaminated manure composition 22. Substantially decontaminated manure composition 22 is then contacted with an aqueous composition comprising *bacillus* spores, 24, delivered from a conduit 25, to form a wet fertilizer composition 26. Wet fertilizer composition 26 is then contacted with a second portion of heated air 28 in a rotating drier 30 to form a solid fertilizer composition 32. Variations of this preferred process, including heat exchange between various streams, use of oxygen in the combustion process, and the like, are considered within the scope of the invention. For example, the air stream 6 could be preheated via heat exchange with hot combustion products 10.

PRESENTATION OF EXPERIMENTS

Experiment #1—Rhizosphere Stimulation

*B. laterosporus* (ATCC PTA-3593), $5 \times 10^8$ spores/ml, was applied to one acre of carrots at planting, emergence, and one week post emergence at 1.5 liters per application. Applications were made via drip inigation, sandy-loam soil, southern California location. A control plot was treated with water only. The same level of N—P—K fertilizer was applied to both plots. At two weeks post emergence twelve samples of rhizosphere soil were taken from each plot and co-mingled aseptically. The co-mingled samples were held at 5 C. and analyzed within 24 hours for Actinomycetes, nitrogen-fixing bacteria, and gram positive/gram negative ratio. Note: *Bacillus* bacteria are gram positive. Results are listed in Table 2. This data provides evidence that *B. laterosporus* (ATCC PTA-3593) stimulates the growth of beneficial microorganisms in the rhizosphere.

TABLE 2

| Sample | Actinomycetes | N-fixing | Gram+/Gram− |
|---|---|---|---|
| Control | $1.3 \times 10^5$ | $<1 \times 10^3$ | 21:1 |
| *B. laterosporus* treated | $2.4 \times 10^6$ | $4.5 \times 10^3$ | 90:1 |

Experiment #2—Rhizosphere Stimulation

*B. licheniformis* (ATCC PTA-6175), $4 \times 10^8$ spores/ml, was applied to one acre of carrots at planting, emergence, and one week post emergence at 1.5 liters per application. Applications were made via drip irrigation, sandy-loam soil, southern California location. A control plot was treated with water only. The same level of N—P—K fertilizer was applied to both plots. At two weeks post emergence twelve samples of rhizosphere soil were taken from each plot and co-mingled aseptically. The co-mingled samples were held at 5C and analyzed within 24 hours for Actinomycetes, nitrogen-fixing bacteria, and gram positive/gram negative ratio. Note: *Bacillus* bacteria are grain positive. The results are presented in Table 3. This data provides evidence that *B. licheniformis* (ATCC PTA-6175) stimulates the growth of beneficial microorganisms in the rhizosphere.

TABLE 3

| Sample | Actinomycetes | N-fixing | Gram+/Gram− |
|---|---|---|---|
| Control | $3 \times 10^4$ | $<1 \times 10^3$ | 27:1 |
| *B. licheniformis* treated | $2.8 \times 10^5$ | $4 \times 10^4$ | 140:1 |

Experiment #3—*Bacillus* Growth in Manure

*B. laterosporus* (ATCC PTA-3952) and *B. licheniformis* (ATCC PTA-6175) were tested for growth in 1% aqueous solutions of layer chicken manure: sterilized, decontaminated, and raw manure solutions were evaluated. Decontaminated manure was treated for 3 years in a compost pit and then sun dried for three weeks, it had a total microbial plate count of $>10^6$ cfu/gm. The raw manure used had a total microbial plate count of $3 \times 10^9$ cfu/gram. *Bacillus* cultures ($5 \times 10^8$ spores/gm) were inoculated into the manure solutions at 1% by volume and subsequently incubated at 34 C for 48 hours; this was done in 250 ml baffled Erlenmeyer flasks shaken constantly at 125 rpm. Total *Bacillus* plate counts and total aerobic/facultative counts were made after 48 hours using tryptic soy agar incubated at 32 C for 72 hours. The *Bacillus* counts were made by first heating the sample for 10 minutes at 80 C to kill non-spore forming bacteria and were then incubated aerobically to recover only *Bacillus*. Results are listed in Table 4. This data provides evidence that Bacilli grow well in chicken manure if it is sterilized or decontaminated but do not grow well in raw manure due to its high concentration of microbial contaminants.

TABLE 4

| Sample | Bacillus Count | Non-Bacillus Count |
|---|---|---|
| B. laterosporus in 1% sterile manure | $9 \times 10^7$/ml | None |
| B. laterosporus in 100 raw manure | $<10^5$/ml | $>10^9$/ml |
| B. laterosporus in 1% decontaminated manure | $2 \times 10^7$/ml | $<10^7$/ml |
| B. licheniformis in 1% sterile manure | $1.5 \times 10^8$/ml | None |
| B. licheniformis in 1% raw manure | $<10^6$/ml | $>10^8$/ml |
| B. licheniformis in 1% decontaminated manure | $9 \times 10^7$/ml | $<10^7$/ml |

Experiment #4—Bacilli+Decontaminated Manure–Potato Trial

One acre plots of Chip variety potatoes, planted in central Utah, were utilized for this experiment. One plot was treated with a Bacillus spore suspension comprised of $4 \times 10^8$ cfu/ml of B. laterosporus (ATCC PTA-3952) and $1 \times 10^8$ cfu/ml of B. licheniformis (ATCC PTA-6175); one liter of this solution was applied via a sprinkler irrigation system at planting, at emergence, and at one and three weeks post emergence. Another plot was treated with 20 gallons of hypochlorite decontaminated layer chicken manure (1% of 68% active calcium hypochlorite into 30% slurry of manure, reacted for 24 hours at 25C) added in four divided applications as for the Bacillus cultures. Another plot was treated with both the Bacillus spore suspension and the decontaminated chicken manure, same levels as indicated above. Finally, two plots were maintained as controls. Control plots received water only. The base fertilizer program used for all treatment and control plots was: 800 lbs 16-20-0-15 and 375 lbs of 21-0-0-24 (these represent percentages of N—P—K-S with P and K calculated as P2O5 and K2O, respectively). The yields were measured at harvest and reported as #of 100 lb (CWT) sacks per acre—four replications were made per plot and the averaged results are reported below. The data are listed in Table 5, which are average of replicates. This data is evidence that a synergistic response—maximum yield of $529 \times 100$ lb sacks/acre—is realized when the Bacillus spore suspension is used in combination with decontaminated manure.

TABLE 5

| Treatment | Yield (CWT/Acre) |
|---|---|
| Control #1 | 360 |
| Control #2 | 390 |
| Bacillus Spore Suspension | 460 |
| Decontaminated Manure | 407 |
| Bacillus Spore Suspension + Decontaminated Manure | 529 |

Experiment #5—Manure Decontamination

A 30% water slurry of layer chicken manure (Minnesota farm) was treated with either calcium hypochlorite (1% of 68% active powder) or concentrated mineral acid to pH 2.0. Four mineral acids were tested: HCl, H2SO4, H3PO4 and HNO3. The treated samples were reacted for 24 hours at 25C and then dried to less than 15% moisture (65C convection oven). A sample of chicken manure composted in an eight-foot deep pit for three years and then sun dried for three weeks was also evaluated—see Experiment #6 for the details of this pit composting procedure. Total aerobic/facultative viable plate counts were made on tryptic soy agar (32 C for 72 hrs) on the raw slurry (untreated), treated slurries, and dry products. Counts were made in triplicate, averages are reported in colony forming units/gram (cfu/gm). This data is presented in Table 6, and is evidence that all chemical treatments, after drying, result in a decontaminated manure product that contains a total microbial plate count of less than $10^6$ cfu/gm. This result is also achieved by long term pit composting followed by sun drying.

TABLE 6

| Sample | Total Microbial Plate Count (cfu) |
|---|---|
| 30% Raw Slurry | $4.4 \times 10^8$/gm |
| 30% Slurry - Hypochlorite treated | $1.3 \times 10^6$/gm |
| 30% Slurry - pH 2.0 treated with HCl | $1.7 \times 10^6$/gm |
| 30% Slurry - pH 2.0 treated with H2SO4 | $1.5 \times 10^6$/gm |
| 30% Slurry - pH 2.0 treated with H3PO4 | $1.8 \times 10^6$/gm |
| 30% Slurry - pH 2.0 treated with HNO3 | $1.4 \times 10^6$/gm |
| Dry Slurry - Hypochlorite treated | $6 \times 10^5$/gm |
| Dry Slurry - pH 2.0 treated with HCl | $8 \times 10^5$/gm |
| Dry Slurry - pH 2.0 treated with H2SO4 | $7 \times 10^5$/gm |
| Dry Slurry - pH 2.0 treated with H3PO4 | $9 \times 10^5$/gm |
| Dry Slurry - pH 2.0 treated with HNO3 | $6 \times 10^5$/gm |
| Pit Composted/Sun dried | $7 \times 10^5$/gm |

Experiment #6—Bacillus Storage in Decontaminated Manure versus N—P—K

Swine manure and layer chicken manure were decontaminated by pit composting (separate pits for each manure type) for three years in 8 ft deep×16 ft wide pits, approximately 10% top soil, organic matter content 6%, was added during the composting process by layering it on the manure as it was added to the pits. Typically, it would take the first year to fill the pits and two additional years to insure that various microbial processes would properly compost and reduce the viable microbial content of the manure. Pits were loosely covered to prevent rain from entering and/or excessive dehydration. The total microbial plate count on the raw manure ranged from 10^9 to 10^10/gram on both manure types. After three years of composting the plate counts ranged from 10^6 cfu/gram to 10^7/cfu gram on both manure types. Subsequently, the composted manure was sun dried, on the ground, in layers approximately 1–2 feet deep; the drying time depended on the weather and sunshine intensity but averaged 3–4 weeks. The viable microbial plate count on both types of manure, after drying, was at or below 10^6 cfu/gram. The moisture contents were below 15%. Manure, decontaminated as above, was blended with *Bacillus* spores (three different probiotic *Bacillus* species were examined separately) by mixing a liquid preparation of the spores into the dried manure so that a viable spore count of 2–6×10^7 cfu/gram was achieved; if the spore suspension contained 2–4×10^9 cfu/gram, the moisture contribution to the dry mixture from the added spore suspension was about 1%. For comparison, the same *Bacillus* species (liquid spore suspensions) were blended with a dry N—P—K mixture, typical of what is used in fertilizer formulations of the present invention (110 parts urea+170 parts super phosphate+40 parts KCl), and N—P—K+decontaminated manure containing 50% by weight of each. All blends were plated for total viable *Bacillus* spores/gram and then stored in the dark, 35C/80% relative humidity, for 6 months; subsequently, total viable *Bacillus* spores/gram were determined.

*Bacillus* Viable Spores/Gram—Procedure

The dry samples containing *Bacillus* spores are mixed in sterile distilled water, 1 part dry sample+9 parts water. This mixture is heated at 80 C for 10 minutes and cooled rapidly, this procedure kills microbial vegetative cells but not *Bacillus* spores. The heated sample is surface streaked, at various dilutions, onto tryptic soy agar plates. Agar plates are then incubated, upright, at 32 C for 72 hours. Counts are made in triplicate, averages reported.

The following *Bacillus* cultures were examined:
*B. laterosporus* (ATCC PTA-3952) code below=B. lat.
*B. licheniformis* (ATCC PTA-6175) code below=B. lich.
*B. subtilis* (ATCC PTA-6174) code below =B. sub.

Manure codes:
DSM=Decontaminated Swine Manure NPK=Dry N—P—K Blend
DCM=Decontaminated Chicken Manure
DSM+NPK=50/50 Mix
DCM+NPK=50/50 Mix Results are reported in Table 7. This data is evidence that decontaminated manure exerts a protective, stabilizing effect on the shelf life of *Bacillus* spores admixed with said manure. By contrast, N—P—K fertilizer compounds exert a destabilizing effect when admixed with *Bacillus* spores. Finally, mixtures of decontaminated manure and N—P—K compounds demonstrate the same stabilizing effect as decontaminated manure alone.

TABLE 7

| Sample | Spores/gram initially | Spores/gram at 6 mo. @ 35 C./80% RH |
|---|---|---|
| *B. lat.* + DSM | 4 × 10^7 | 4 × 10^7 |
| *B. lich.* + DSM | 6 × 10^7 | 7 × 10^7 |
| *B. sub.* + DSM | 3 × 10^7 | 2 × 10^7 |
| *B. lat.* + DCM | 5 × 10^7 | 6 × 10^7 |
| *B. lich.* + DCM | 6 × 10^7 | 8 × 10^7 |
| *B. sub.* + DCM | 2 × 10^7 | 2 × 10^7 |
| *B. lat.* + NPK | 4 × 10^7 | 3 × 10^6 |
| *B. lich.* + NPK | 7 × 10^7 | 4 × 10^6 |
| *B. sub.* + NPK | 2 × 10^7 | 9 × 10^5 |
| *B. lat.* + DSM + NPK | 4 × 10^7 | 3 × 10^7 |
| *B. lich.* + DSM + NPK | 6 × 10^7 | 4 × 10^7 |
| *B. sub.* + DSM + NPK | 3 × 10^7 | 3 × 10^7 |
| *B. lat.* + DCM + NPK | 5 × 10^7 | 4 × 10^7 |
| *B. lich.* + DCM + NPK | 5 × 10^7 | 6 × 10^7 |
| *B. sub.* + DCM + NPK | 2 × 10^7 | 1 × 10^7 |

Experiment #7 Humic Acid Effect on Prill Hardness

Fertilizer formulations, consistent with the teachings of the present invention, produced according to the formulation set out in Example 1, were produced for this experiment. The effect of different sources of humic acid were examined with respect to prill compression strength measured in newtons. Sodium bentonite was also examined as a control substance (non-humic substance). The humic acid ingredients were included at 180 parts per 1050 parts of total ingredients. Specifics of the humic acids tested:

1) Humic acid from oxidized lignite—high fulvic acid content (HA-HF).

2) Humic acid from oxidized lignite—low fulvic acid content (HA-LF).

3) Humic acid in the form of potassium humate (PH)

4) Sphagnum peat moss containing humic acid (SPM).

5) Sodium bentonite, 325 mesh, a non-humic acid substance (SB).

The results are listed in Table 8. This data demonstrates that humic acids from oxidized lignite and potassium humate promote advantageous hardness values, humic acids in the form of sphagnum moss produce borderline hardness, and non-humic acid containing substances such as sodium bentonite do not produce acceptable hardness.

TABLE 8

| Binding Ingredient | Prill Hardness (newtons) |
|---|---|
| HA-HF | 6.5 |
| HA-LF | 6.0 |
| PH | 6.0 |
| SPM | 5.5 |
| SB | <5.0 |

The novel fertilizer formulations of the present invention can be successfully produced by anyone skilled in the art of fertilizer production. The present invention is not limited in scope to following the embodiments disclosed below. Within the broad field of fertilizer art and science there are production options open to those skilled in the trade that may yield an equivalent result to those presented herein; for example, substitution of a pelletizing technique for the prilling process of the present invention would be considered a violation of the rights of the inventor and the assignee. The uniqueness of the discoveries of the present invention cannot be compromised by trivial substitutions that do not add to the technical merits of the present invention.

Production of Prilled Fertilizer Products

Decontaminated Manure Ingredient

Dry ingredients including decontaminated manure, humic acid, and N—P—K compounds (if used) are ground to 100–150 mesh, blended, and then conveyed into a granulator where an aqueous spore suspension of *Bacillus* microorganisms is sprayed onto the revolving dry ingredients. The decontaminated manure must have a total viable plate count (total aerobic+facultative microorganisms plated on tryptic soy agar, 32 C, 72 hrs) of less than 10^7 colony-forming-units (cfu)/gram. Most preferably, to effect a purity rating of 90% or greater (measured as % *Bacillus* bacteria contained within the total viable plate count of aerobic/facultative microorganisms), said decontaminated manure should have a viable plate count of less than 10^6 cfu/gram and a moisture content below 15%. Acceptable methods for decontaminating manure are indicated in Experiment #5.

Chicken manure from layer chickens is one preferred type of manure, swine manure from animals on antibiotic free feed is also acceptable. A combination of layer chicken and swine manure has been used successfully in the art of the present invention and is specified in Example #1. The sole use of layer chicken manure is specified in Example #2. Examples #1 & 2 use manures that were decontaminated by pit composting as detailed in Experiment #6. The layer chicken manure used in Example #3 was decontaminated by pH adjustment to pH 2.0 with HCl followed by convection air drying at 65C, described in detail in Experiment #5. An example of hypochlorite decontaminated manure, used successfully in a potato field trial, is presented in Experiment #4. All of these manure decontamination methods, unique to the present invention, can be regarded as preferred embodiments.

Manure from ruminant animals such as cattle and sheep, or from broiler chickens, is not generally useful for the purpose of the present invention because it usually contains a high percentage of non-nutritive substances such as sawdust, rice hulls, straw or other forms of litter and bedding. The art and science of the present invention does not rule out the use of these manure types if they can be obtained free of undesirable substances and rendered below $1\times10^7$ cfu/gram with respect to total, viable, aerobic/facultative microorganisms.

The percentage of decontaminated manure, contained within the total of dry ingredients utilized, ranges from 20–70% by weight depending on the intended application of the formulation being produced. Preferably, formulations will contain 30–60% of decontaminated manure; the formulations presented in Examples 1–3 fall within this range.

Decontaminated manure provides a novel, dual effect with respect to the present invention. First, it acts to stabilize the probiotic *Bacillus* spores within the formulation which would otherwise be unstable in the presence of N—P—K ingredients (see Experiment #6). Second, it acts to stimulate the growth of the probiotic *Bacillus* bacteria in both lab cultures and field trials resulting in higher yields of plants such as potatoes (see Experiments #3 & 4).

Humic Acid Ingredient

The humic acid ingredient of the present invention acts to promote the hardness of prills/pellets—this is set out in Experiment #7. Humic acid products that are derived from lignite coal, more specifically oxidized lignite, usually come in mixtures with fulvic acid; they are acceptable for the purpose of the present invention. A good source of oxidized lignite that suites the purpose of the present invention is available from Black Hills Bentonite. LLC of Mills, Wyo.— called leonardite, it has a typical humic acid content of 86–87% and a fulvic acid content of 8% (referred to as HA-LF in Experiment #7). A source that has a higher content of fulvic acid, about 30%, is available from leonardite formations in New Mexico (referred to as HA-HF in Experiment #7). The quantity of humic acid substance that is required for the purpose of the present invention ranges from 5–25%, by weight of the total dry ingredients, and depends on the requirements of the specific formulation; the quantities indicated in Examples 1–3 fall within this range.

N—P—K Ingredients

These are optional. Addition of conventional N—P—K ingredients to formulations of the present invention allows for the production of complete fertilizer products. Such a product can be used as a sole source of fertilizer in many applications, or, as an augmenting fertilizer used together with conventional chemical fertilizers.

In situations where the formulations of the present invention are used to augment existing chemical fertilizers, it is common to discover that the total amount of N required, and in some cases P and K as well, can be reduced with the achievement of equal or better results. The biofertilizer properties of the present invention are responsible for this effect.

The chemicals commonly used in agriculture to provide sources of nitrogen (N), phosphorus (P), and potassium (K) are not generally compatible with the probiotic *Bacillus* bacteria specified in this disclosure. Fortunately, the stabilizing effect of the decontaminated manure ingredient offsets this effect—see Experiment #6.

Examples of suitable N—P—K ingredients that can be used in formulations of the present invention include but are not limited to: Urea, superphosphate, Ca(H2PO4)2, ammonium sulfate, ammonium nitrate, ammonium phosphate, calcium nitrate, KCl, orthophosphate salts of sodium or potassium, potassium sulfate, potassium nitrate, sodium nitrate, and tricalcium phosphate. It is also within the scope of the present invention to fortify formulations with elemental sulfur, sulfur compounds, or trace elements if a particular situation demands their use.

The total amount of N—P—K ingredients added to a particular formulation must be balanced against the weight requirements of the decontaminated manure and humic acid substances as specified above. Generally, in those formulations where N—P—K ingredients are indicated, inclusion rates will be 20–60%. This is the range in Examples #1 & 2 where the respective N—P—K levels are 6-3-3 and 8-4-8.

*Bacillus* Spore Suspension Ingredient

About 5–15% of de-chlorinated water is applied by weight to the dry ingredients, said water contains all of the *Bacillus* spores required to produce a batch; preferably, the *Bacillus* spores are contained in 10%, calculated by weight of the total dry ingredients, of de-chlorinated water. The *Bacillus* solution is sprayed onto the dry ingredients as they revolve within a granulator, or, alternatively, an agglomerating dish set at an angle. The spray is through a nozzle that disperses the solution in medium-fine droplets over an area about 1 ft. in diameter. The moistened ingredients are then conveyed into a rotating drying tunnel where the temperature of the product is maintained at 70–90 C for 8–16 minutes as it moves through the tunnel; preferably, the product is maintained at 80 C for a transit time of 8–10 minutes. Subsequently, the product enters a cooling tunnel and is cooled to 30–40 C within 8–10 minutes. The resulting prills, formed by the rotation and drying process, are screened for size and filled into fertilizer bags, completing the process. Typical fertilizer prills produced according to the above preferred embodiments have a *Bacillus* plate count between $2-9\times10^7$ cfu/gram, a hardness rating of 5.5–6.5 newtons, moisture content of 12–16%, *Bacillus* purity of >90%, diameter of 2–6 mm, and shelf-life of 6–12 mo. at 35C A photograph of fertilizer prills produced according to the above specifications is attached to this disclosure.

The *Bacillus* spore suspension can be prepared by conventional techniques well understood by industrial microbiologists. Resulting spore suspensions should have a viable *Bacillus* spore count of between 100,000,000 cfu/ml (=$1\times10^8$ cfu/ml) to 10,000,000,000 cfu/ml (=$1\times10^{10}$ cfu/ml), a typical satisfactory count for the practice of the present invention is 500,000,000 cfu/ml (=$5\times10^8$ cfu/ml). For purposes of the present invention a suitable method of preparing a spore suspension, for any of the Bacilli listed in the Summary of the Invention, is as follows:

A good microbiological medium suitable for the cultivation of *Bacillus* is prepared in baffled Erlenmeyer flasks sterilized at 121 C under 15 psig for 30 minutes or until rendered sterile. Tryptic soy broth (TSB) is a suitable growth medium as is Schaeffer's Sporulation Medium as referenced in *Biology of Bacilli* (Doi, et al. Butterworth-Heinemann, 1992). It is desireable to under fill the flasks to optimize aeration during shaking; 200 ml of medium works well in a 4 liter flask. The flask is fitted with a sterile filter cap that allows the contents to breath without becoming contaminated. The sterile medium is inoculated from a slant culture on tryptic soy agar (a slant with good growth is melted and poured into the flask). The inoculated medium is shaken on a rotary, orbital shaker at 100–200 rpm at 32 C for 48 hours. Most Bacilli will be 90% sporulated by 48 hours and a concentration of $5\times10^8$/ml is easily achieved with most species. The three species of *Bacillus* used in Examples #1–3 were prepared in the above manner but scaled up to 1,000 liters. Scale up parameters are as follows:

A 1,000 liter aerobic fermentor (or larger) is utilized. The fermentor must be equipped for in-place sterilization at 121 C/15 psig, able to be aerated with sterile air at 1 volume air/minute/volume of fermentor contents, temperature controlled and pH monitored. Although industrial grade fermentation ingredients can be used, commercial tryptic soy broth (TSB) from Difco Laboratories or BBL Laboratories is satisfactory. Depending on the efficiency of the fermentation equipment, it may be advantageous to prepare the TSB at 1.5 or 2.0 times the strength recommended on the label. The medium is prepared in the fermentor, or in a separate vessel, and charged raw into the fermentor. It is then sterilized at 121 C, cooled to 32 C, and inoculated at 1% by volume from shake flasks prepared as above. Sterile air is constantly sparged into the inoculated medium at one vol./min./vol. fermentor contents. The initial pH is adjusted to between 6.8–7.2, if necessary, using sterile 50% NaOH or concentrated HCl. The fermentor is agitated constantly at 100+ rpm while being held at 32 C for 48 hours. At 48 hours the contents of the fermentor are adjusted to pH 7.0 with the neutralizing compounds previously mentioned, the fermentor contents can then be used directly to prepare the formulations of the present invention as set out in Examples #1–3.

EXAMPLE #1

Preferred Embodiment Formulation—6-3-3 Vegetable Fertilizer

A microbial active fertilizer formulation containing organic, inorganic, and viable microbial cultures is prepared according the present invention. Layer chicken manure and swine manure, 50% by weight of each, was decontaminated by anaerobic/facultative composting for three years in an 8 ft. deep pit, amended with 10% top soil that was layered onto the manure as the pit was filled during the first year and then held, loosely covered, for two more years at which time it was removed from the pit and dried to below 15% moisture in the sun, for three weeks, while layered on the ground in piles 1–2 feet deep. Said manure, after drying, was determined to have a total viable plate count (anaerobic/facultative count on TSA/32C./72hrs.) of $7 \times 10^5$ cfu/gram. Prior to treatment said manure had a total viable plate count of $>1 \times 10^9$ cfu/gram; therefore, the pit composting/sun drying decontamination procedure reduced the total viable plate count by a minimum of three powers of ten, or three logs.

Separate aerobic fermentations were carried on two probiotic species of *Bacillus* bacteria, each species was grown separately. *Bacillus laterosporus* (ATCC PTA-3952) and *Bacillus licheniformis* (ATCC PTA-6175), strains that enhance the numbers of beneficial microorganisms in the rhizosphere (see Experiments #1 & 2.), were grown in sterile tryptic soy broth (TSB) in 1,000 liter aerobic fermentors for 48 hours at 32 C while continually agitated at 150 rpm and continually sparged with sterile air at 1,000 liters/minute. At 48 hours the pH was adjusted to 7.0 with either NaOH or HCl and the liquid spore suspensions were cooled to 20 C and held until used. For the purpose of the present example, a blend was prepared from the two spore suspensions: 80% by volume of *B. laterosporus* was blended with 20% by volume of *B. licheniformis* and the resulting spore count of the blend was determined to be $8 \times 10^8$ cfu/ml (1 ml=1 gram). This blend was used to inoculate the formulation of the present example during the granulation step described below.

TABLE 9

| Ingredient | Amount in Kg | Wt. %* |
|---|---|---|
| Decontaminated Chicken + Swine Manure | 500 | 50 |
| Humic Acid (from oxidized lignite)** | 180 | 18 |
| Superphosphate, Ca(H2PO4)2 | 170 | 17 |

TABLE 9-continued

| Ingredient | Amount in Kg | Wt. %* |
|---|---|---|
| Urea | 110 | 11 |
| KCl | 40 | 04 |
| Bacillus spore suspension | 50 kg | |
| | 1050 kg | 100% |

*Only dry ingredients included
**Fulvic acid <9%

The total mixed and ground dry ingredients were conveyed onto a revolving agglomerating (granulating) conical dish, operated at a 45 degree angle, and the *Bacillus* spore suspension (diluted 50% with de-chlorinated water) was sprayed on at the rate of 10% by weight of the dry ingredients. Subsequently, the moistened ingredients were conveyed into a revolving drying tunnel where the product was dried and formed into prills (2–6 mm diameter). The air temperature in the drying tunnel ranged from 230–250 C, the product temperature never exceeded 80 C The drying tunnel/drum was 90 feet long by five feet wide and was custom built so no commercial brand can be given. Transit time in the drying tunnel was 7–10 minutes followed by an equal amount of time in the cooling tunnel that immediately followed the drying tunnel. Product arrived at the screening belt at 30–40 C where prills less than 2 mm in diameter were rejected. Subsequently the prilled product was filled into 20 kg fertilizer bags. The product specifications are listed in Table 10.

TABLE 10

Product Specifications:

| | |
|---|---|
| Bacillus Spore Count: | $3.8 \times 10^7$ cfu/gram (representing 95% recovery) |
| Bacillus as % of Total Plate Count: | 96% |
| Moisture Content: | 14% |
| N-P-K rating: | 6-3-3 (calculated as % N, % P2O5, % K2O) |
| % Organic Matter: | 68% |
| Prill Diameter: | 2–6 mm, 4 mm average |
| Prill hardness: | 6 newtons |
| Bacillus Spore Count after 6 Mo. at 35 C.: | $3.7 \times 10^7$/gram |
| Recommended Use Rate for Vegetables: | 800–1,200 lbs/acre as a complete fertilizer |

EXAMPLE #2

Preferred Embodiment Formulation—8-4-8 Rice Fertilizer

A microbial active fertilizer formulation containing organic, inorganic, and viable microbial cultures is prepared according the present invention. Layer chicken manure was decontaminated by anaerobic/facultative composting for three years in an 8 ft. deep pit, amended with 10% top soil that was layered onto the manure as the pit was filled during the first year and then held, loosely covered, for two more years at which time it was removed from the pit and dried to below 15% moisture in the sun, for three weeks, while layered on the ground in piles 1–2 feet deep. Said manure, after drying, was determined to have a total viable plate count (anaerobic/facultative count on TSA/32C./72hrs.) of $9 \times 10^5$ cfu/gram. Prior to treatment said manure had a total viable plate count of $>1 \times 10^9$ cfu/gram; therefore, the pit composting/sun drying decontamination procedure reduced the total viable plate count by a minimum of three powers of ten, or three logs.

An aerobic fermentation was carried on two probiotic strains of *Bacillus*, the strains were grown together in the fermentor but maintained separately in shake flasks which served as the inoculum for the fermentor. *Bacillus laterosporus* (ATCC PTA-3952) and *Bacillus laterosporus* (ATCC PTA-3593), a species that enhances the numbers of beneficial microorganisms in the rhizosphere (see Experiments #1 & 2.), were grown in sterile tryptic soy broth (TSB) in 1,000 liter aerobic fermentors for 48 hours at 32 C while continually agitated at 150 rpm and continually sparged with sterile air at 1,000 liters/minute. At 48 hours the pH was adjusted to 7.0 with either NaQH or HCl and the liquid spore suspensions were cooled to 20 C and held until used. The resulting spore count of this two strain culture was determined to be 5×10^8 cfu/ml (1 ml=1 gram). This blend was used to inoculate the formulation of the present example during the granulation step described below.

A dry mix of the ingredients listed in Table 11 was prepared and ground to pass through a 150 mesh screen.

TABLE 11

| Ingredient | Amount in kg | Wt. %* |
|---|---|---|
| Decontaminated Chicken Manure | 350 | 35 |
| Humic Acid (from oxidized lignite)** | 100 | 10 |
| Superphosphate, Ca(H2PO4)2 | 266 | 26.6 |
| Urea | 157 | 15.7 |
| KCl | 127 | 12.7 |
| *Bacillus* spore suspension | 50 kg | |
| | 1050 kg | 100% |

*Only dry ingredients included
**Fulvic acid <9%

The total mixed and ground dry ingredients were conveyed onto a revolving agglomerating (granulating) conical dish, operated at a 45 degree angle, and the *Bacillus* spore suspension (diluted 50% with de-chlorinated water) was sprayed on at the rate of 10% by weight of the dry ingredients. Subsequently, the moistened ingredients were conveyed into a revolving drying tunnel where the product was dried and formed into prills (2–6 mm diameter). The air temperature in the drying tunnel ranged from 230–250 C, the product temperature never exceeded 80 C The drying tunnel/drum was 90 feet long by five feet wide and was custom built so no commercial brand can be given. Transit time in the drying tunnel was 7–10 minutes followed by an equal amount of time in the cooling tunnel which immediately followed the drying tunnel. Product arrived at the screening belt at 30–40 C where prills less than 2 mm in diameter were rejected. Subsequently the prilled product was filled into 20 kg fertilizer bags. The product specifications are listed in Table 12.

TABLE 12

| Product Specifications: | |
|---|---|
| *Bacillus* Spore Count: | 2.4 × 10^7 cfu/gram (representing 96% recovery) |
| *Bacillus* as % of Total Plate Count: | 95% |
| Moisture Content: | 14.4% |
| N-P-K rating: | 8-4-8 (calculated as % N, % P2O5, % K2O) |
| % Organic Matter: | 45% |
| Prill Diameter: | 2–6 mm, 4 mm average |
| Prill hardness: | 5.5 newtons |
| *Bacillus* Spore Count after 6 Mo. at 35 C.: | 2.4 × 10^7/gram |

TABLE 12-continued

| Product Specifications: | |
|---|---|
| Recommended Use Rate for Rice: | 50–200 lbs/acre as a co-fertilizer with urea |

EXAMPLE #3

Preferred Embodiment Formulation—Top Dress 30-1-1 Fertilizer

A microbial active fertilizer formulation containing only nitrogenous ingredients and viable microbial cultures was prepared according the present invention. Layer chicken manure was decontaminated by treatment at pH 2.0 with concentrated hydrochloric acid; approximately 1% hydrochloric acid (containing 35% HCl) was added to a 30% slurry of manure, with agitation, until pH 2.0 was achieved. It was then reacted for 24 hours before being dried in a drum dryer at 65C until a moisture content below 15% was achieved. The total viable plate count on the untreated manure was >10^9/gram; after reaction with hydrochloric acid and drying, the total plate count was reduced to 8×10^5/gram which represents a reduction in count of greater than 1,000 fold (plated on TSA/32C./72hrs.).

An aerobic fermentation was carried on a probiotic strain of *Bacillus subtilis* (ATCC PTA-6174). The strain was grown in a 1,000 liter fermentor inoculated from a TSB shake flask culture, multiple shake flasks served as the inoculum which was added at 1% of the working volume of the fermentor. This is a strain of *Bacillus subtilis* that has proven to be antagonistic to plant pathogenic fungi. The strain was grown in sterile tryptic soy broth (TSB) in the fermentor for 48 hours at 32 C while under agitation at 150 rpm and sparging with sterile air at 1,000 liters/minute. At 48 hours the pH was adjusted to 7.0 with either NaOH or HCl and the liquid spore suspension was cooled to 20 C and held until used. The resulting spore count of this culture was determined to be 7×10^8 cfu/ml (1 ml 1 gram). This blend was used to inoculate the formulation of the present example during the granulation step described below.

A dry mix of the ingredients listed in Table 13 was prepared and ground to pass through a 150 mesh screen.

TABLE 13

| Ingredient | Amount in Kg | Wt. %* |
|---|---|---|
| Decontaminated Chicken Manure | 300 | 30 |
| Humic Acid (from oxidized lignite)** | 100 | 10 |
| Urea | 600 | 60 |
| *Bacillus* spore suspension | 50 kg | |
| | 1050 kg | 100% |

*Only dry ingredients included
**Fulvic acid >25%

The total mixed and ground dry ingredients were conveyed onto a revolving agglomerating (granulating) conical dish, operated at a 45 degree angle, and the *Bacillus* spore suspension (diluted 50% with de-chlorinated water) was sprayed on at the rate of 10% by weight of the dry ingredients. Subsequently, the moistened ingredients were conveyed into a revolving drying tunnel where the product was dried and formed into prills (2–6 mm diameter). The air temperature in the drying tunnel ranged from 230–250 C, the product temperature never exceeded 80 C The drying tunnel/drum was 90 feet long by five feet wide and was custom built so no commercial brand can be given. Transit time in the drying tunnel was 7–10 minutes followed by an equal amount of time in the cooling tunnel which immediately followed the drying tunnel. Product arrived at the screening belt at 30–40 C where prills less than 2 mm in diameter were rejected. Subsequently the prilled product was filled into 20 kg fertilizer bags. The product specifications are listed in Table 14.

TABLE 14

Product Specifications:

| | |
|---|---|
| Bacillus Spore Count: | $3 \times 10^7$ cfu/gram (representing 86% recovery) |
| Bacillus as % of Total Plate Count: | 95% |
| Moisture Content: | 14.4% |
| N-P-K rating: | 30-1-1 (calculated as % N, % P2O5, % K2O) |
| % Organic Matter: | 45% |
| Prill Diameter: | 2–6 mm, 4 mm average |
| Prill hardness: | 6.5 newtons |
| Bacillus Spore Count after 6 Mo. at 35 C.: | $2.9 \times 10^7$/gram |
| Recommended Use Rate for Plants: | 100–400 lbs/acre for top dress applications |

EXAMPLE #4

Improved Vegetable Yields—Field Trials

The 6-3-3 formulation from Example #1 (indicated as Bio-6-3-3) was compared to an inorganic 6-3-3 product (indicated as CK-6-3-3) as a fertilizer for a variety of vegetables. The inorganic product contained the same N—P—K ingredients as the formulation of Example #1 only they were incorporated into a non-biologically active carrier (sodium bentonite). Trials were carried out in sandy-loam soil with an organic matter content of 2%, two application levels were tested, one at a "low average" use rate for the particular vegetable type in this soil, and the other at ½ this rate. Sub-optimum use rates assist in differentiating fertilizer effectiveness. These rates are indicated in Table 15 as either "100%" or "50%." The 100% quantity for a particular vegetable is set out in parenthesis under the name of the vegetable. The fertilizer was applied in four divided applications, one at planting and the others at 7, 14 and 21 days post emergence, the post emergence applications were side-dressed. All plants were watered by sprinkler irrigation using non-chlorinated water. Harvesting was done manually. Results are listed in Table 15.

TABLE 15

| | YIELDS (tons/acre) | | | |
|---|---|---|---|---|
| VEGETABLE | BIO-6-33 (100%) | BIO-6-3-3 (50%) | CK-6-3-3 (100%) | CK-6-3-3 (50%) |
| Tomatoes (1600 lbs) | 24.0 | 21.3 | 18.1 | 11.0 |
| Carrots (1200 lbs) | 32.2 | 28.0 | 18.2 | 14.1 |
| Cabbage (1200 lbs) | 51.8 | 45.3 | 38.0 | 26.9 |
| Cauliflower (1200 lbs) | 9.4 | 8.8 | 6.2 | 5.1 |
| Potatoes | 28.0 | 26.8 | 16.6 | 12.0 |

The data of Table 15 are evidence that the BIO-6-3-3 formulation of the present invention significantly outperforms the control CK-6-3-3 fertilizer. In addition to significantly higher yields at 100% use rates, the BIO-6-3-3 product shows significantly less reduction in yield when used at the 50% level compared to the control formulation, CK-6-3-3.

EXAMPLE #5

Improved Rice Yields—Field Trial

The formulation of Example #2 (referred to as BIO-8-4-8) was used in rice farming as a booster fertilizer to supplement urea, the usual source of nitrogen. All experimental plots were one hectare square, all were irrigated, all were planted with paddy rice variety IR-64 transplanted from a nursery plot at 21 days. In all BIO-8-4-8 plots, said product was applied at 110 kg/ha, one time at transplanting. Urea was applied at three different rates: 240 kg/ha (100%), 180 kg/ha (75%), and 120 kg/ha (50%). The 110 kg of BIO-8-4-8 supplied $2.64 \times 10^{12}$ cfu, or 2.64 trillion cfu, of Bacillus microorganisms and 38.5 kg of decontaminated layer chicken manure per hectare. Control plots received urea as the only fertilizer. The rice was harvested after 83 days (post transplanting) and yields were reported in metric tons per hectare (mt/ha). The results are listed in Table 16.

TABLE 16

| % N (from urea) | Control (mt/ha) | BIO-8-4-8 (mt/ha) | % Improvement |
|---|---|---|---|
| 100% | 8.55 | 9.55 | 11.7 |
| 75% | 8.38 | 9.25 | 10.4 |
| 50% | 8.31 | 9.15 | 10.1 |

The data listed in Table 16 are evidence that the product known as BIO-8-4-8 significantly improved rice yield at all three levels of nitrogen. The production of rice in developing countries is extremely cost sensitive, many farmers have no choice but to use less than optimal nitrogen levels. The present invention can help to improve yield when either 100% N or less is used.

EXAMPLE #6

Fruit Tree Yields—Field Trial

The formulation of Example #3 was used to enhance the yield of fruit trees when used as a side-dress at the base of trees. Five hundred grams was applied per tree per month for six months starting one month prior to budding. The product (referred to as BIO-30-1-1) is watered-in immediately after application. The effect is measured as an improvement in fruit yield Tests were run at commercial operations and no conventional practice was changed to accommodate the BIO-30-1-1 product, results are reported from 100 trees treated with BIO-30-1-1 vs. 100 untreated, control, trees for each fruit tree listed. The results are listed in Table 17.

TABLE 17

| Tree Type | Yield - BIO-30-1-1 (Bushels/100 Trees) | Yield - Untreated (Bushels/100 Trees) |
|---|---|---|
| Apple (Granny Smith) | 520 | 405 |
| Apple (Red Delicious) | 512 | 422 |
| Pear (Bartlett) | 372 | 291 |
| Peach | 506 | 390 |
| Apricot | 292 | 207 |
| Almond | 5,800 lbs | 4,210 lbs |

The data of Table 17 are evidence that multiple applications of the inventive product known as BIO-30-1-1 significantly improves fruit yield. The total application, over 6 months, of 3 kg of BIO-30-1-1 provides $9\times10^{10}$ (90 billion) total *Bacillus* spores and 900 grams of decontaminated layer chicken manure per tree.

It will be apparent to those skilled in the art that various modifications and alterations can be made in the above formulations, techniques and applications without departing from the scope of the present invention. Therefore, it is not intended that this invention be limited by the terms of the general disclosure presented above or by the experiments and examples, but only by the claims that follow.

What is claimed is:

1. A fertilizer composition comprised of decontaminated manure and *Bacillus* spores, wherein the decontaminated manure has a total aerobic/facultative viable plate count reduced by 2–4 logs (100 to 10,000 times) compared to raw manure, the *Bacillus* spores are present in sufficient concentration to effect a viable spore count of between $10^6$ cfu to $10^9$ cfu per gram of dry composition, and the *Bacillus* spores are derived from *Bacillus* selected from the group consisting of *Bacillus laterosporus* (ATCC PTA-3952), *Bacillus laterosporus* (ATCC PTA-3593), *Bacillus licheniformis* (ATCC PTA-6175), *Bacillus subtilis* (ATCC PTA-6174), and mixtures thereof.

2. The fertilizer composition of claim 1 comprising a humic acid.

3. The fertilizer composition of claim 2 comprising an additive selected from the group consisting of N compounds, P compounds, K compounds, and combinations thereof.

4. The fertilizer composition of claim 3 where the decontaminated manure, the *Bacillus* spores, the additive, and the humic acid are blended into an admixture resulting in a granular or powdered product.

5. The fertilizer composition of claim 4 where the decontaminated manure, the *Bacillus* spores, the additive, and the humic acid are formed into prills or pellets.

6. The fertilizer composition of claim 1 wherein the decontaminated manure is derived from layer chicken manure, swine manure or a combination thereof.

7. The fertilizer composition of claim 2 wherein the humic acid is derived from lignite.

8. The fertilizer composition of claim 3 where the N compound are selected from the group consisting of urea, ammonium sulfate, ammonium nitrate, ammonium phosphate, calcium nitrate, potassium nitrate, sodium nitrate; the P compounds are selected from the group consisting of ammonium phosphate, superphosphate, $Ca(H_2PO_4)_2$, tricalcium phosphate, phosphate salts of sodium or potassium, including orthophosphate salts; and the K compounds are selected from the group consisting of KCl, potassium sulfate, potassium nitrate, and phosphate salts of potassium, including orthophosphate salts.

9. The fertilizer composition of claim 1 wherein the decontaminated manure is derived from raw manure decontaminated by pit composting and solar drying.

10. The fertilizer composition of claim 1 wherein the decontaminated manure is derived from reaction of raw manure with concentrated mineral acid and subsequently dried.

11. The fertilizer composition of claim 1 wherein the decontaminated manure is derived from reaction of raw manure with a hypochlorite compound and subsequently dried.

12. The fertilizer composition of claim claim 1 wherein the *Bacillus* spores are prepared in water suspension and combined with the decontaminated manure in said suspension.

13. The fertilizer composition of claim 1 wherein the *Bacillus* spores are derived from mixtures of two or more of *Bacillus laterosporus* (ATCC PTA-3952), *Bacillus laterosporus* (ATCC PTA-3593), *Bacillus licheniformis* (ATCC PTA-6175), and *Bacillus subtilis* (ATCC PTA-6174).

14. The fertilizer composition of claim 1 wherein the *Bacillus* spores are derived from *Bacillus laterosporus* (ATCC PTA-3952).

15. The fertilizer composition of claim 1 where the *Bacillus* spores are derived from *Bacillus laterosporus* (ATCC PTA-3593).

16. The fertilizer composition of claim 1 wherein the *Bacillus* spores are derived from *Bacillus licheniformis* (ATCC PTA-6175).

17. The fertilizer composition of claim 1 where the *Bacillus* spores are derived from *Bacillus subtilis* (ATCC PTA-6174).

18. The fertilizer composition of claim 2 wherein the humic acid is leonardite.

19. The fertilizer composition of claim 2 wherein the humic acid is potassium humate.

20. A solid fertilizer composition for plant production comprised of decontaminated manure, *Bacillus* spores, humic acid and, optionally, one or more N—P—K compounds, wherein the *Bacillus* spores are from strains of probiotic *Bacillus* bacteria that enhance beneficial microbial populations within a rhizosphere of a plant.

21. The fertilizer composition of claim 20 formulated as a complete fertilizer.

22. The fertilizer composition of claim 20 formulated as a supplemental fertilizer.

23. The fertilizer composition of claim 20 wherein the decontaminated manure is selected from the group consisting of decontaminated layer chicken manure, decontaminated swine manure, and mixtures thereof.

* * * * *